United States Patent [19]

Trivett

[11] Patent Number: 5,074,913
[45] Date of Patent: Dec. 24, 1991

[54] HOT MELT PIPE COATING COMPOSITIONS

[75] Inventor: Robert L. Trivett, Aurora, Ill.

[73] Assignee: Nalco Chemical Company, Naperville, Ill.

[21] Appl. No.: 632,572

[22] Filed: Dec. 24, 1990

[51] Int. Cl.$^5$ ............................................. C04B 9/02
[52] U.S. Cl. ............................. 106/14.34; 106/14.35; 106/14.41
[58] Field of Search ................ 106/14.34, 14.35, 14.41

[56] References Cited

U.S. PATENT DOCUMENTS

| | | | |
|---|---|---|---|
| 1,335,757 | 4/1920 | Schmid | 106/14.3 X |
| 3,080,330 | 3/1968 | Rudel et al. | 106/14.29 |
| 4,846,986 | 7/1989 | Trivett | 252/49.5 |
| 4,851,043 | 7/1989 | Dotson et al. | 106/14.11 |

FOREIGN PATENT DOCUMENTS 57-043864  3/1982  Japan.

Primary Examiner—William R. Dixon, Jr.
Assistant Examiner—Margaret V. Einsmann
Attorney, Agent, or Firm—John G. Premo; Robert A. Miller

[57] ABSTRACT

The following composition provides a superior hot melt pipe coating for both black ferrous and galvanized pipes. This coating contains no volatile organic compounds (VOC) and therefore no atmospheric emissions.

| INGREDIENTS | % BY WEIGHT |
|---|---|
| A. $C_{14}$–$C_{22}$ Fatty Acid Triglyceride | 0–15 |
| B. Aliphatic Terpene Hydrocarbon Resin | 15–30 |
| C. Ethylene Copolymer | 40–60 |
| D. Synthetic Paraffin Wax | 15–30 |
| E. Anti-oxidant | 0.5–2 |

5 Claims, No Drawings

HOT MELT PIPE COATING COMPOSITIONS

INTRODUCTION

Pipe coatings are usually applied at a pipe mill to ferrous black and galvanized pipe surfaces to offer long-term corrosion protection while pipe is stored outdoors prior to use. A large percentage of such pipe is used in the petroleum and construction industries. Such coatings are permanent and are designed not to be removable. These coatings are often pigmented to hide surface blemishes on the pipe surface. The coatings must be transparent enough, however, in order to read stenciling on the pipe surface.

For years, pipe coatings tended to be solvent based, relying on the use of resins as the product backbone. Solvent-based products usually offer good corrosion protection but suffer from limitations during applications such as potential flash-fire hazards due to high solvent concentrations in atmosphere. Also, they tend to dry very slowly resulting in tacky pipe surfaces which can result in pipe binding during stacking/storage or the initiation of corrosion before the coating is thoroughly dry. In addition, solvent concentrations in atmosphere above acceptable standards pose a serious health risk to mill workers.

Several new water-based pipe coatings have been developed over the past few years. They are usually blends of water, alkyd resins and alcohol-based cosolvents as well as some alkaline components. Pipe coatings are often applied to warmed pipe (heated from previous operations) and are dependent on the residual heat and air circulation to dry the coating. Dry film thicknesses used range from 0.5 to 1.5 mils. Solvent-base products have switched over the past few years to the use of trichloroethane, which is non-flammable. Increasing concerns about it being a potential carcinogen and lower VOC (Volatile Organic Compound) limits are beginning to restrict its use.

Most prior art coatings are not resistant to ultraviolet light and break down on exposure to sunlight. This causes a corresponding reduction in corrosion protection.

One of the major advantages achieved by the present invention is that it eliminates volatile organic compounds, e.g. solvents, and at the same time provides superior corrosion protection. The composition of the invention are solids which allows them to be applied as thin coatings. They have excellent resistance to ultraviolet light and are relatively free from being removed by the outdoor elements such as rain, snow and wind.

THE INVENTION

The invention provides a hot melt pipe coating composition for preventing the corrosion of ferrous metal and galvanized pipes under conditions of long term outdoor storage having the following composition:

| INGREDIENTS | | % BY WEIGHT |
|---|---|---|
| A. | C14–C22 Fatty Acid Triglyceride | 0–15 |
| B. | Aliphatic Hydrocarbon Resin | 15–30 |
| C. | Ethylene Co-polymer | 40–60 |
| D. | Synthetic Paraffin Wax | 15–30 |
| E. | Anti-oxidant | 0.5–2 |

Preferred embodiments of the invention are further described below:

| INGRE-DIENTS | % BY WEIGHT | | |
|---|---|---|---|
| | Preferred Compositions | Composition A | Composition B |
| A | 5–15 | 10 | 0 |
| B | 20–25 | 25 | 20 |
| C | 44–54 | 44 | 54 |
| D | 20–25 | 20 | 25 |
| E | 1 | 1 | 1 |

In the examples hereafter, Ingredient A in Composition A is the triglyceride of 12-hydroxystearic acid and E is 2,6-di-tertiary-butyl-para-cresol. In Composition B Ingredient E is P,P'-dioctyldiphenylamine. In Composition A, Ingredient D is Synthetic Paraffin Wax A. In Composition B, Ingredient D is Synthetic Paraffin Wax B, which are described more fully hereafter.

When high temperature coatings are needed, Ingredient A is omitted and Synthetic Paraffin Wax B is used.

Typical physical properties are summarized below for both compositions:

| | | Composition A | Composition B |
|---|---|---|---|
| Appearance: | Solid | Off-white, hard solid | Off-white, hard solid |
| | Liquid | Clear, amber liquid | Clear, amber liquid |
| Melt Point: | | 195° F. | 225° F. |
| Acid Value: | | 0.5 | 3.2 |
| Flash Point (C.O.C.) | | 535° | 550° |

THE C-14-22 FATTY ACID TRIGLYCERIDES

These esters contain in the fatty acid portion from 14 to 22 carbon atoms. They may contain branch substituents such as —OH. The preferred triglycerides are saturated. They may be mixed triglycerides of the types commonly found in animal fats and vegetable oils.

In a preferred embodiment, the substantially saturated triglyceride is formed from the hydrogenation of castor oil, more specifically the hydrogenation of ricinoleic acid (12-hydroxyoleic) which comprises 89.7 percent by weight of castor oil. The substantially saturated ester has a melting point of from 186° F. to 191° F.

In a more preferred embodiment, the substantially saturated ester is a triglyceride of 12-hydroxystearic acid, resulting from the hydrogenation of ricinoleic acid. Ricinoleic acid is an 18-carbon acid with a double bond in the 9–10 position and a hydroxyl group on the twelfth carbon atom. Saturation of such double bonds converts each hydroxyoleic chain to hydroxystearic. In a very preferred embodiment, the substantially saturated triglyceride derived from ricinoleic acid is a composition having an acid number of 2.2, a saponification number of 180, an iodine value of 2.2 and melting point of 188.5° F.

THE ALIPHATIC HYDROCARBON RESIN

This resin may be selected from any number of aliphatic hydrocarbon resins of the types used in the adhesive industry. A particularly useful material is sold under the trade name Piccotac 95 Resin, Hercules, Inc.

Piccotac 95 is a narrow-molecular-weight-distribution, aliphatic hydrocarbon resin designed for the adhesives industry. It is compatible with most popular elastomers and polymers used in the industry and is soluble in both aliphatic and aromatic solvents. More specifically, Piccotac 95 is an aliphatic hydrocarbon resin polymerized from a C5 terpene feedstock.

| Typical Properties | |
|---|---|
| Softening point, R&B, °C. | 91-97 |
| Color, Gardner | 5 |
| Specific gravity at 25° C. | 0.950 |
| Acid number | <1 |
| Flashpoint, COC, °F. | 555 |
| Viscosity, at 25° C. stokes | 2.9 |
| GPC molecular weight | |
| Mw | 1,550 |
| Mn | 875 |
| Mw/Mn | 1.75 |
| Mz | 3,520 |
| Melt viscosity, °C. | |
| 10 poises | 155 |
| 100 poises | 125 |
| 1,000 poises | 110 |

THE ETHYLENE CO-POLYMERS

These resins are preferably co-polymers of ethylene and acrylic acid or ethylene and vinyl acetate with the latter co-polymers being preferred. Particularly useful co-polymers are manufactured by Allied-Signal, Inc. Typical of such materials are the following:

| Co-polymers | Viscosity-cps @140° C. (Brookfield) | Acid Number mg KOH/g | Mettler Drop Point °F. | Hardness dmm (ASTM D-5) |
|---|---|---|---|---|
| Ethylene-Acrylic Acid | | | | |
| A-C 540, A-C 540A | 500 | 40 | 226 | 2.0 |
| 580 | 650 | 75 | 216 | 4.0 |
| 5120 | 650 | 120 | 198 | 11.5 |

| | | % Vinyl Acetate | | |
|---|---|---|---|---|
| Ethylene-Vinyl Acetate | | | | |
| A-C 400, A-C 400A | 610 | 13 | 203 | 9.5 |
| 405(S) | 600 | 11 | 203 | 7.0 |
| 405(M) | 600 | 8 | 210 | 5.0 |
| 405(T) | 600 | 6 | 217 | 4.0 |

THE SYNTHETIC PARAFFIN WAX

These waxes are obtained by extraction from lube oil stocks or they may be prepared synthetically by the well known Fischer-Tropsch reaction. A preferred wax is a Fischer-Tropsch wax sold under the trade name Paraflint Hl. Paraflint Hl is a hard, high melting point, low viscosity synthetic wax produced by the Fischer-Tropsch process. It is free of aromatics and consists of saturated hydrocarbons with an average Carbon Number of 53.

Synthetic Paraffin Wax A

| Average Molecular Mass | 750 |
|---|---|
| Molecular Mass Spread | 478-1400 |
| Typical Carbon Content (mass %) | 85.4 |
| Typical Hydrogen Content (mass %) | 14.6 |

Paraflint Hl has a congealing point of 208° F., viscosity of 10 cps at 250° F. and a flash point of over 400° F.

Synthetic Paraffin Wax B

When high temperature coatings are needed, Paraflint C2 is used. Paraflint C2 is also a synthetic wax which is a crystallized fraction derived from Paraflint Hl. Paraflint C2 has an average molecular weight of 1,262, congealing point of 221° F., viscosity of 21 cps at 250° F. and a flash point of over 500° F.

THE ANTI-OXIDANTS

The lubricant may also contain from 0.1 to 2.0 weight percent of a hindered phenol antioxidant, preferably 2,6-di-tertiary-butyl-para-cresol with a melting point of 147° F. A preferred anti-oxidant for the higher melting point formulas is Vanlube 81, p,p'-dioctyldiphenylamine.

TEMPERATURE OF APPLICATION AND THICKNESS OF THE COATINGS

As indicated, Composition A may be considered as a lower temperature coating which has a melting point of 195° F. Composition B, the high temperature coating, has a melting point of about 225° F.

Since the pipes are hot during their processing, it is a simple matter to apply the coatings to the hot pipe just as the manufacturing procedures are terminating. To provide uniformity of coating the surface temperature of the pipe is preferably between about 20°-35° F. above the melting point of the coating composition being applied.

The coatings are applied to furnish an overall thickness of between 0.5-2 mils. In a preferred embodiment of the invention, they are applied at a thickness of between 1-1.5 mils.

EXAMPLES

In the following examples, several test methods were used. These are as follows: Salt spray, ASTM Designation: B 117-85. Humidity Cabinet, ASTM Designation: D 2247-87. The UV tests are, ASTM Designation D 4587-86 and ASTM Designation: G 53-84. The disclosure of these ASTM test procedures are incorporated herein by reference.

In the tests below Composition C is a commercial organic solvent based coating. Composition D is a water based commercial organic coatings all of which have been used with some degree of success in coating ferrous pipes.

EXAMPLE 1

Various two inch lengths of the uncoated black pipe were coated with Composition A (hot melt applied at 1.0 mil). Samples of Composition C (1.0 mil dry coating) solvent-coated pipe again were used as controls. Sample of both products were placed on plastic rods in horizontal position in salt spray cabinet. Tests were run for 48 hours exposure in salt spray cabinet at 5% salt concentration according to ASTM B-117. Results are summarized below:

| PRODUCT | DEGREE OF CORROSION |
| --- | --- |
| Composition C | 75% Scattered Rust |
| Composition A | 5% Scattered Rust |

Composition A offered excellent corrosion protection, as evaluated via salt spray, versus Composition C solvent coating.

EXAMPLE 2

Several one-inch diameter ferrous pipe samples were coated with Composition A hot melt pipe coating at dry film thickness of 1.0 mil. Additional one-inch diameter galvanized samples were also coated at the same coating weight. Samples of all three pipe/product combinations were placed on plastic rods in horizontal position in new humidity cabinet (100% relative humidity/100° F.) Samples of Composition C on ferrous pipe (1.0 mil dry coating) were used as controls. Samples were exposed for seven continuous days. Results are summarized below:

| PRODUCT | DEGREE OF CORROSION |
| --- | --- |
| Composition C (ferrous) | 50% Scattered Rust |
| Composition A (ferrous) | 2% Scattered Rust |
| Composition A (galvanized) | 5% Scattered Rust |

Composition A hot melt pipe coating offered excellent corrosion protection on both ferrous and galvanized pipes. Composition C solvent-base coating offered poor protection as it did in salt spray tests. Composition C coating showed extensive softening, peeling and discoloration (whitening). Composition A hot melt coating remained firm and homogeneous on both substrates, and showed no signs of tackiness or discoloration.

EXAMPLE 3

Several four inch lengths of 5.5 inch diameter uncoated black ferrous pipe were coated with Composition A (hot melt applied at 1.0 mil). This large diameter pipe was acquired directly from a pipe mill and represents normal type of pipe used in the oil industry. Samples of Composition A pipe and Composition C solvent-base coated pipe (control) were exposed for seven days in a humidity cabinet (100% relative humidity/100° F.). Pipes were placed on plastic rods in horizontal position in a humidity cabinet. Results are summarized below:

| PRODUCT | DEGREE OF CORROSION |
| --- | --- |
| Composition C | 45% Scattered Rust |
| Composition A | 2% Scattered Rust |

Composition A offered excellent corrosion protection on ferrous black pipe versus competitive solvent-base product as evaluated by humidity cabinet exposure. This confirms all past results. Composition A hot melt coating remained firm and homogeneous. Coating showed no signs of tackiness or discoloration.

EXAMPLE 4

Ferrous black pipe and galvanized pipe were used as the test substrates. Composition A was hot melt applied to both substrates at film thickness of 1.0 mil. Both substrates were dipped in Composition D coating as received and allowed to dry for 24 hours at ambient temperature prior to testing. Samples of both product/substrate combinations were placed on plastic rods in horizontal position in salt spray cabinet. Tests were run for 48 hours exposure in salt spray cabinet at 5% salt concentration according to ASTM B-117. Results are summarized below:

| PRODUCT | DEGREE OF CORROSION | |
| --- | --- | --- |
| | FERROUS | GALVANIZED |
| Composition D | 75% Scattered Rust | 45% Scattered Stain |
| Composition A | 15% Scattered Rust | 10% Scattered Stain |

Composition A offered superior corrosion protection in salt spray corrosion test versus Composition D on both pipe substrates evaluated.

EXAMPLE 5

Ferrous black pipe and galvanized pipe were used as the test substrates. Composition A was hot melt applied to both substrates at film thickness of 1.0 mil. Both substrates were dipped in Composition D coating as received and allowed to dry 24 hours at ambient temperature prior to testing. Samples of both product/substrate combinations were placed on plastic rods in horizontal position in humidity cabinet. Tests were run for seven continuous days in new humidity cabinet at 100° F./100% relative humidity. Results are summarized below:

| PRODUCT | DEGREE OF CORROSION | |
| --- | --- | --- |
| | FERROUS | GALVANIZED |
| Composition D | 15% Scattered Rust | 10% Scattered Stain |
| Composition A | 5% Scattered Rust | 5% Scattered Stain |

Composition A offered better protection than the Composition D coating on both pipe substrates evaluated.

EXAMPLE 6

Two inch lengths of the 5.5" diameter pipe were coated as follows:

A. Composition A hot melt applied at 1.0–1.5 mils.

B. Composition C was applied by dipping the pipe sample into the product at ambient temperature. Samples were air dried for 48 hours at ambient temperature prior to testing. Pipe samples were weighed before and after. Final dry coating film thickness was 9.06 mils.

This coating weight is much higher than the normal 1.0 mil usually applied. They usually cut the Composition C Low VOC 50:50 with solvent and spray it. This corrosion test, therefore, represents an optimal protection situation.

Samples of both products were placed on plastic rods in horizontal position in salt spray cabinet. Tests were run for 48 hours exposure in salt spray cabinet at 5% salt concentration according to ASTM B-117. Results are summarized below.

| PRODUCT | DEGREE OF CORROSION |
| --- | --- |
| Composition A | 5% Edge Rust |
| Composition C LOW VOC | 35% Scattered Rust |

EXAMPLE 7

This example presents seven day humidity cabinet results on uncoated ferrous black pipe samples. Four inch lengths of 5.5 inch diameter pipe were coated as follows:

A. Composition A hot melt applied at 1.0-1.5 mils.

B. Composition C applied at dry coating film thickness of 9.06 mils by dipping pipes at ambient temperature and drying 48 hours at ambient conditions. This coating weight is much higher than the normal 1.0 mil coating thickness usually run. This coating weight should represent optimal corrosion protection conditions.

Samples of both products were placed on plastic rods in horizontal position in a modified humidity cabinet (100% relative humidity/100° F.). Samples were exposed for seven continuous days. Results are summarized below:

| PRODUCT | DEGREE OF CORROSION |
| --- | --- |
| Composition A | 2% Edge Rust |
| Composition C Low VOC | 20% Scattered Rust |

Composition A hot melt coating again offered superior corrosion protection versus Composition C. The higher Composition C coating weight did reduce the degree of corrosion versus past evaluations (20% versus 45-50%), but again, was easily outperformed by Composition A. Composition C coating had softened substantially, and in some areas showed signs of loss of film adhesion as well as discoloration (white or opaque).

EXAMPLE 8

Black ferrous pipe samples were placed in horizontal position in a humidity cabinet (100% relative humidity/100° F.). Samples were then exposed for 55 continuous days. Corrosion protection was again excellent for 1.0 mil film coating weight with only 4-5% edge rust present on the black pipe substrate.

Composition A hot melt pipe coating offered excellent protection on the black pipe substrate, the coating remaining homogeneous, uniform in coverage and non-tacky in nature.

EXAMPLE 9

Black ferrous pipe samples were coated at dry film thickness of 1.0 mil of Composition B. Samples were exposed for seven continuous days in a humidity cabinet. Results were excellent after seven days exposure with only 1% scattered edge rust. Coating remained firm and homogeneous with no signs of tackiness or adhesion loss.

EXAMPLE 10

ASTM G53-84 (Standard Practice for Operating Light and Water Exposure Apparatus Fluorescent UV-Condensation Type for Exposure of Non-Metallic Materials) covers the basic principles and operating procedures for using fluorescent ultraviolet (UV and condensation apparatus to simulate the deterioration caused by sunlight and water as rain or dew). ASTM D4587-86 (Standard Practice for Conducting Tests on Paint and Related Coatings and Materials Using a Fluorescent UV-Condensation Light and Water-Exposure Apparatus) covers the selection of test conditions from Practice G53 to be employed for exposure testing of paint and related coatings and materials. The specific procedure chosen for testing was Procedure A Cycle: Eight hours of ultraviolet light only at 70° C. followed by four hours of 100% condensation at 50° C. All coatings were applied to ferrous black pipe samples at dry coating thickness of 1.0 mil. Pipe samples were aged seven days at ambient conditions prior to testing. Results are summarized below for 500 hours exposure (using the cycle listed above):

| PRODUCT | EXPOSURE RESULTS |
| --- | --- |
| Composition D | 100% corrosion, severe degradation. |
| Composition C | 100% corrosion, severe degradation. |
| Composition A | 3% scattered pinpoint rust, coating intact and homogeneous. |

Results confirm all past corrosion results for hot melt coating, Composition A, versus competitive products (both solvent and aqueous based), and the fact that Composition A consistently outperforms all competitive products in all corrosion tests (salt spray, humidity cabinet and Cleveland condensing cabinet). These new results also confirm that our coating has excellent UV resistant properties and has the attributes of being a coating with the ability to withstand long-term exposure to natural ultraviolet radiation.

An important performance benefit associated with both hot melt coating Compositions A and B is the reduced wear they will exhibit on all pipe handling system surfaces. After exiting the prime coater, many pipes will roll over a series of horizontal rail systems which will transfer the pipe to bundling and shipping locations within the pipe mill. Both Compositions A and B offer extremely low co-efficients of friction (0.10) versus those of conventional solvent-aqueous pipe coatings (0.30). These lower co-efficients of friction result in superior resistance to blocking (adhesion). This will allow far easier handling for the coated pipe versus conventional coatings. Pipes will move at quicker speeds over transfer surfaces and such compositions will minimize wear on those surfaces from the moving pipe.

I claim:

1. A solid organic hot melt pipe coating composition free of organic solvents for preventing the corrosion of ferrous metal pipes under conditions of long term outdoor storage which eliminates the problem of atmospheric emissions due to volatile organic compounds and which composition has the following make-up:

| INGREDIENTS | % BY WEIGHT |
| --- | --- |
| A. $C_{14}$-$C_{22}$ Fatty Acid Triglyceride | 0-15 |
| B. Polymerized Aliphatic Terpene Hydrocarbon Resin | 15-30 |
| C. Ethylene Copolymer | 40-60 |
| D. Synthetic Paraffin Wax | 15-30 |
| E. Anti-oxidant | 0.5-2 | wherein the copolymer is a copolymer of ethylene with vinyl acetate or acrylic acid.

2. The hot melt pipe coating composition of claim 1 where A is 5-15% by weight.

3. The hot melt pipe coating composition of claim 1 where B is 20-25, C is 44-54, D is 20-25 and E is 1.

4. The hot melt pipe coating composition of claim 1 where A is 10 and is the triglyceride of 12-hydroxystearic acid, B is 25, C is 44, D is 20 and E is 1.

5. The hot melt pipe coating composition of claim 1 where A is 0, B is 20, C is 54, D is 25 and E is 1.

* * * * *